United States Patent
Jung et al.

(10) Patent No.: US 9,715,362 B2
(45) Date of Patent: Jul. 25, 2017

(54) PRINT CONTROLLING APPARATUS, IMAGE FORMING APPARATUS, METHOD OF CONTROLLING PRINT, METHOD OF IMAGE FORMING AND COMPUTER-READABLE RECORDING MEDIUM

(71) Applicant: SAMSUNG Electronics Co., Ltd., Suwon-si, Gyeonggi-do (KR)

(72) Inventors: Joo-young Jung, Suwon-si (KR); So-hye Kim, Seoul (KR); Ho-jin Ahn, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/897,493

(22) Filed: May 20, 2013

(65) Prior Publication Data

US 2014/0085681 A1 Mar. 27, 2014

(30) Foreign Application Priority Data

Sep. 25, 2012 (KR) .................. 10-2012-0106696

(51) Int. Cl.
| | | |
|---|---|---|
| *H04N 1/40* | (2006.01) | |
| *G06F 3/12* | (2006.01) | |
| *G06K 15/02* | (2006.01) | |
| *H04N 1/00* | (2006.01) | |
| *H04N 1/387* | (2006.01) | |
| *G06T 11/60* | (2006.01) | |

(52) U.S. Cl.
CPC .......... *G06F 3/1298* (2013.01); *G06F 3/1208* (2013.01); *G06F 3/1242* (2013.01); *G06F 3/1244* (2013.01); *G06K 15/1848* (2013.01); *G06T 11/60* (2013.01); *H04N 1/00352* (2013.01); *H04N 1/3871* (2013.01)

(58) Field of Classification Search
None
See application file for complete search history.

(56) References Cited

U.S. PATENT DOCUMENTS

| | | | | |
|---|---|---|---|---|
| 6,429,878 B1* | 8/2002 | Turek et al. | .................. | 345/636 |
| 2005/0243346 A1* | 11/2005 | Foehr et al. | .................... | 358/1.9 |
| 2008/0068670 A1* | 3/2008 | Nakanishi | .............. | H04N 1/387 358/448 |
| 2012/0062916 A1* | 3/2012 | Lee | .......................... | H04N 1/58 358/1.9 |
| 2012/0194883 A1* | 8/2012 | Yamanaka | ............. | G06K 9/342 358/532 |

FOREIGN PATENT DOCUMENTS

JP 2012014586 A * 1/2012

* cited by examiner

*Primary Examiner* — Vincent Rudolph
*Assistant Examiner* — Richa Mishra
(74) *Attorney, Agent, or Firm* — Staas & Halsey LLP

(57) ABSTRACT

A print controlling apparatus includes a user interface to input a printing command of a document displaying a plurality of overlaid objects, a printing data generator to detect a transparency region where a transparency is set, in the overlaid objects, to generate a transparency image by calculating a pixel value of the transparency region, based on the pixel value of each object and the transparency, and to generate printing data comprising the transparency image, and a communication interface to send the printing data to the image forming apparatus.

18 Claims, 16 Drawing Sheets

FIG. 7

1. Brush XOR ROP Command (0x5A)
2. Pattern Brush AND ROP Command (0xA0)
3. Brush XOR ROP Command (0x5A)

FIG. 8

1. Bitmap XOR ROP Command (0x66)
2. Bitmap 1bit patern AND ROP Command (0x88)
3. Bitmap XOR ROP Command (0x66)

FIG. 10

A. The number of elements applying the background color
B. Width of the pattern
C. Length of the pattern
D. Weight determined per device Alpha(%) = (A/(B*C))*100*D

FIG. 11

| 1 | 1 | 1 | 1 | 0 | 0 | 0 | 0 | 1 | 1 | 1 | 1 | 0 | 0 | 0 | 0 |
|---|---|---|---|---|---|---|---|---|---|---|---|---|---|---|---|
| 1 | 1 | 1 | 1 | 1 | 0 | 0 | 1 | 1 | 1 | 1 | 1 | 0 | 0 | 0 | 1 |
| 1 | 0 | 0 | 1 | 1 | 1 | 1 | 1 | 0 | 0 | 1 | 1 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 1 | 1 | 1 | 1 | 1 | 0 | 0 | 0 | 1 | 1 | 1 | 1 | 1 |
| 1 | 1 | 1 | 1 | 1 | 0 | 0 | 1 | 1 | 1 | 1 | 1 | 0 | 0 | 1 | 1 |
| 1 | 1 | 1 | 1 | 0 | 0 | 0 | 0 | 1 | 1 | 1 | 1 | 0 | 0 | 0 | 0 |
| 1 | 1 | 1 | 1 | 0 | 0 | 0 | 0 | 1 | 1 | 1 | 1 | 0 | 0 | 0 | 0 |
| 1 | 1 | 1 | 1 | 0 | 0 | 0 | 1 | 1 | 1 | 1 | 1 | 0 | 0 | 0 | 1 |
| 1 | 0 | 0 | 1 | 1 | 1 | 1 | 1 | 0 | 0 | 1 | 1 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 1 | 1 | 1 | 1 | 1 | 0 | 0 | 0 | 1 | 1 | 1 | 1 | 1 |
| 1 | 1 | 1 | 1 | 1 | 0 | 0 | 1 | 1 | 1 | 1 | 1 | 0 | 0 | 1 | 1 |
| 1 | 1 | 1 | 1 | 0 | 0 | 0 | 0 | 1 | 1 | 1 | 1 | 0 | 0 | 0 | 0 |

25% ALPHA BLENDING

PRINT CONTROLLING APPARATUS, IMAGE FORMING APPARATUS, METHOD OF CONTROLLING PRINT, METHOD OF IMAGE FORMING AND COMPUTER-READABLE RECORDING MEDIUM

CROSS-REFERENCE TO RELATED APPLICATIONS

This application claims priority under 35 U.S.C. §119 (a) from Korean Patent Application No. 2012-0106696 filed on Sep. 25, 2012 in the Korean Intellectual Property Office, the entire disclosure of which is incorporated herein by reference.

BACKGROUND OF THE INVENTION

1. Field of the Invention

The present general inventive concept relates generally to a print controlling apparatus, an image forming apparatus, a method of controlling print, a method of image forming, and a computer-readable recording medium. More particularly, the present general inventive concept relates to a print controlling apparatus to generate and output an alpha-blended image of a transparency object when printing data includes the transparency object, an image forming apparatus, a method of controlling print, a method of image forming, and a computer-readable recording medium.

2. Description of the Related Art

In general, an image forming device prints printing data generated by a device such as computer, onto a recording paper. Examples of the image forming device include a copier, a printer, a fax machine, and a Multi-Function Peripheral (MFP) for incorporating the functions of them in a single device.

A user can apply various effects to a document generated using an application program. Among them, a transparency function, which makes the document look classy, is frequently used by many users in the document writing. However, when the document with the transparency is printed, the transparency is not printed clearly as it seems to be clear on a screen of a display device.

In detail, a conventional printer driver generates the printing data in a printer language such as PCL and PS. Since such a printer language does not define an alpha blending process, a word processor converts data to pattern ROP and provides the converted data to the printer driver. Accordingly, conventional printer driver and image forming device render and output the transparency pattern of the original document according to the pattern ROP.

However, the pattern ROP combines two object images using the transparency pattern and shows the two images blended according to the result. When an image is combined with a particular halftoning screen used for halftoning in the image forming device, its image quality can be degraded.

Further, the degraded image quality can distort the defined pattern when the original image is enlarged or reduced and thus produce an unpleasant output. Particularly, when the scale is not precisely an integral multiple such as ½, 2×, and 4×, the output result can be further degraded.

SUMMARY OF THE INVENTION

The present general inventive concept provides a print controlling apparatus to generate an alpha-blended image of a transparency object when printing data includes the transparency object, an image forming apparatus, a method of controlling print, a method of image forming, and a computer-readable recording medium.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a print controlling apparatus including a user interface to input a printing command of a document displaying a plurality of overlaid objects, a printing data generator to detect a transparency region where a transparency is set, in the overlaid objects, to generate a transparency image by calculating a pixel value of the transparency region, based on a pixel value of each object and the transparency, and to generate printing data including the transparency image, and a communication interface to send the printing data to the image forming apparatus.

The printing data generator may include a renderer to render each object in the document according to one or more rendering commands, a transparency detector to detect an input region of the rendering commands of a preset combination, as a transparency region when the rendering commands of a preset combination are input for the same region, and a data generator to generate a transparency image by calculating a pixel value of the detected transparency region, and to generate the printing data including the generated transparency image.

When an XOR rendering command, an AND rendering command, and an XOR rendering command are sequentially input for the same region, the transparency detector may detect the region as the transparency region.

The printing data generator may further include a transparency calculator for, when the transparency region is detected, calculating a transparency of the detected transparency region.

The transparency calculator may calculate the transparency by calculating a ratio of a background value to a whole size of a transparency pattern.

The transparency calculator may calculate the transparency by considering a weight preset for the image forming apparatus.

The data generator may generate the transparency image by calculating a pixel value based on a pixel value of a background object in the transparency region, a pixel value of an overlaid object in the transparency region, and the calculated transparency with respect to pixel regions in the detected pixel region.

The data generator may generate the transparency image by alpha-blending the detected transparency region.

The data generator may generate the printing data by replacing the detected transparency region with the generated transparency image in an image rendered by the renderer.

The data generator may generate the printing data in a PCL or PS printer language.

The foregoing and/or other features and utilities of the present general inventive concept may also be achieved by providing an image forming apparatus including a communication interface to receive printing data, an image processor to detect a transparency region where a transparency is set, from a plurality of overlaid objects in the received printing data, to generate a transparency image by calculating a pixel value of the transparency region, based on pixel values of the objects and the transparency, and to generate second printing data including the transparency image, and an image former to print the generated second printing data.

The image processor may include a renderer to render each object in the printing data according to one or more rendering commands, a transparency detector to detect an input region of the rendering commands of the preset combination as a transparency region when rendering commands of a preset combination are input for the same region, and a printing data generator to generate a transparency image by calculating a pixel value of the detected transparency region, and to generate the printing data including the generated transparency image.

The printing image generator may generate the transparency image by alpha-blending the detected transparency region.

The foregoing and/or other features and utilities of the present general inventive concept may also be achieved by providing a print controlling method of a print controlling apparatus connected to an image forming apparatus, the method including inputting a printing command of a document displaying a plurality of overlaid objects, detecting a transparency region where a transparency is set, in the overlaid objects, generating a transparency image by calculating a pixel value of the transparency region, based on the pixel value of each object and the transparency, generating printing data including the transparency image, and sending the printing data to the image forming apparatus.

The print controlling method may further include when detecting the transparency region, calculating a transparency of the detected transparency region.

The generating of the transparency image may generate the transparency image by calculating a pixel value based on a pixel value of a background object in the transparency region, a pixel value of an overlaid object in the transparency region, and the calculated transparency with respect to pixel regions in the detected pixel region.

The foregoing and/or other features and utilities of the present general inventive concept may also be achieved by providing an image forming method of an image forming apparatus, the method including receiving printing data, detecting a transparency region where a transparency is set, from a plurality of overlaid objects in the received printing data, generating a transparency image by calculating a pixel value of the transparency region, based on pixel values of the objects and the transparency, generating second printing data including the transparency image, and printing the generated second printing data.

The image forming method may further include when detecting the transparency region, calculating a transparency of the detected transparency region.

The generating of the transparency image may generate the transparency image by calculating a pixel value based on a pixel value of a background object in the transparency region, a pixel value of an overlaid object in the transparency region, and the calculated transparency with respect to pixel regions in the detected pixel region.

The foregoing and/or other features and utilities of the present general inventive concept may also be achieved by providing a computer-readable recording medium to contain computer readable codes as a program to execute the method described above and hereinafter.

The foregoing and/or other features and utilities of the present general inventive concept may also be achieved by providing an apparatus usable in an image forming system to print an image on a print medium, including a printing data generator configured to detect a transparency region according to a transparency from an image having one or more overlaid objects, to generate a transparency image by calculating a pixel value of the transparency region, based on a pixel value of each object and the transparency, and to generate printing data including the transparency image such that the generated printing data can be printed on a printing medium.

The apparatus may further include a user interface to input a printing command of the image having the overlaid objects, and a communication interface to send the printing data to an image forming apparatus of the image forming system such that the image forming apparatus prints the printing data on a printing medium.

The apparatus may further include a communication interface to receive original printing data including an image with the overlaid objects, and an image former to print the generated printing data on the printing medium.

The printing data generator may generate the transparency image according to a halftoning level and a color component value of a corresponding pixel of the transparency region.

The printing data generator may generate the transparency image according to values of a halftoning and a color component of the objects in the transparency region and a weight corresponding to image forming system.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 7 and 8 are diagrams illustrating rendering commands to generate the document of FIG. 6;

FIG. 10 is a diagram illustrating a method of calculating a transparency using a transparency pattern according to an embodiment of the present general inventive concept;

FIG. 11 is a diagram illustrating a transparency pattern from a word processor according to an embodiment of the present general inventive concept;

DETAILED DESCRIPTION OF THE PREFERRED EMBODIMENTS

Figure 1:
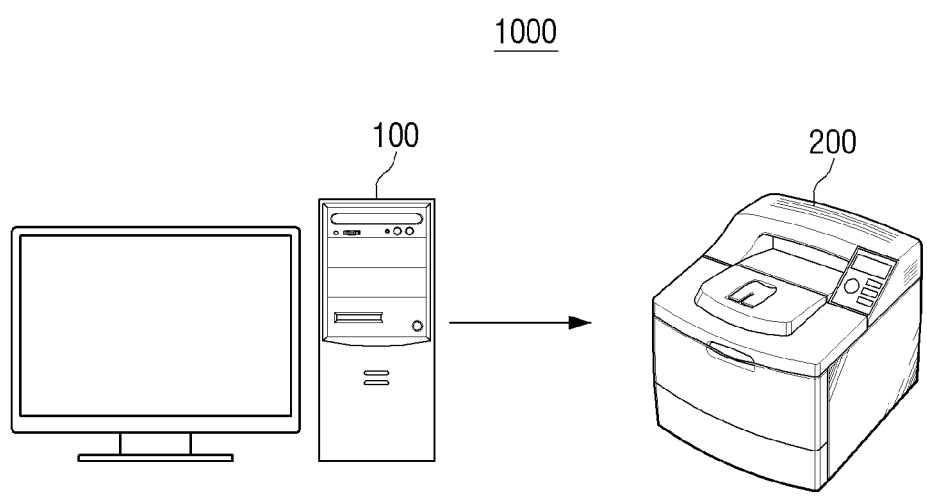
FIG. 1 is a view illustrating an image forming system according to an embodiment of the present general inventive concept.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

FIG. 1 is a block diagram illustrating an image forming system 1000 according to an embodiment of the present general inventive concept.

Referring to FIG. 1, the image forming system 1000 includes a print controlling apparatus 100 and an image forming apparatus 200.

The print controlling apparatus 100 receives a printing command and generates printing data. In detail, the print controlling apparatus 100 can receive the printing command of a document from a user and generate the printing data of the document according to the received printing command. The print controlling apparatus 100 will be explained in more detail by referring to FIGS. 2 and 3. Herein, the print controlling apparatus 100 can employ a personal computer (PC), a notebook computer apparatus, a tablet computer apparatus, a portable phone, a smart phone, a PMP, an MP3, and so on.

The image forming apparatus 200 receives the printing data and prints the received printing data. In detail, the image forming apparatus 200 can receive the printing data from the print controlling apparatus 100 and print the received printing data. The image forming apparatus 200 will be described in more detail by referring to FIGS. 4 and 5. Herein, the image forming apparatus 200 can employ a copier, a printer, a fax machine, or a Multi Function Peripheral (MFP) which incorporates the functions of them in one device.

FIG. 1 illustrates the image forming system 1000 to include both the print controlling apparatus 100 and the image forming apparatus 200. However, the present general inventive concept is not limited thereto. It is possible that only one of the two apparatuses can be included and the other apparatus can employ a conventional device in the implementation. In detail, when the print controlling apparatus 100 of the present general inventive concept is used, a conventional image forming device can receive and print the printing data. When the image forming apparatus 200 of the present general inventive concept is used, a conventional print controlling device can generate and send the printing data.

FIG. 1 also illustrates the print controlling apparatus 100 and the image forming apparatus 200 directly connected to each other. However, the present general inventive concept is not limited thereto. It is possible that the print controlling apparatus 100 and the image forming apparatus 200 may be connected indirectly via a router and a server in the implementation or may be wirelessly connected.

Figure 2:
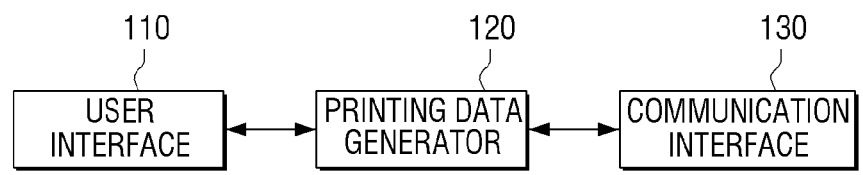
FIG. 2 is a block diagram illustrating a print controlling apparatus according to an embodiment of the present general inventive concept.

FIG. 2 is a block diagram illustrating the print controlling apparatus 100 of FIG. 1 according to an embodiment of the present general inventive concept.

Referring to FIG. 2, the print controlling apparatus 100 can include a user interface 110, a printing data generator 120, and a communication interface 130.

The user interface 110 includes a plurality of functions to allow a user to set or select various functions supported by the print controlling apparatus 100, and displays information provided from the print controlling apparatus 100. The user interface 110 may be implemented using a device, such as touch screen or panel, as an input unit and output unit at the same time, or using a device combining a mouse and a monitor.

The user interface 110 can display a printable document. Hence, the user can set the document to print and print options of the corresponding document, through a user interface window provided through the user interface 110.

The user interface 110 can select a transparency enhance option. In detail, the user interface 110 can display the user interface window and select the transparency enhance option through the displayed user interface window. The user interface window may be illustrated in FIG. 13, for example. Herein, the transparency enhance option is an option to detect whether the transparency is applied to the document, and print the document by applying an algorithm to prevent image quality degradation of the transparency. Thus, when the user selects the transparency enhance option, a transparency region of the document can be detected. While the transparency enhance option is not applied, the transparency may be detected in the implementation. Herein, the algorithm to prevent the image quality degradation creates and uses a transparency image using alpha blending, rather than a pattern of run of paper (pattern ROP), of the transparency region. Herein, the alpha blending is a process for representing a transparent image by adding a variable a (alpha) indicating the transparency to general image data.

The user interface 110 can display a preview image of a current document when the transparency enhance option is selected. In detail, the user interface 110 can display an output of the alpha-blended transparency image, as the preview image.

The printing data generator 120 detects the transparency region of the set transparency from a plurality of overlaid objects, generates the transparency image by calculating a pixel value of the transparency region based on pixel values and transparencies of the objects, and generates the printing data including the transparency image. The printing data generator 120 will be explained in more detail by referring to FIG. 3.

The communication interface 130 is connected with the image forming apparatus 200 or a general image forming apparatus, and provides the image forming apparatus with the printing data to be processed by the image forming apparatus and a printing option. The printing data to be processed by the image forming apparatus includes Page Description Language (PDL) data written in Printer Command Language (PCL) or PostScript (PS) language. In detail, the communication interface 130 can be formed to interconnect the print controlling apparatus 100 and an external device, and employ a parallel port, a Universal Serial Bus (USB) port, and a wireless port.

Although FIG. 2 Illustrates the print controlling apparatus 100, the print controlling apparatus 100 may further include other components to perform its functions. The print controlling apparatus 100 will be explained in more detail by referring to FIG. 3.

Figure 3:
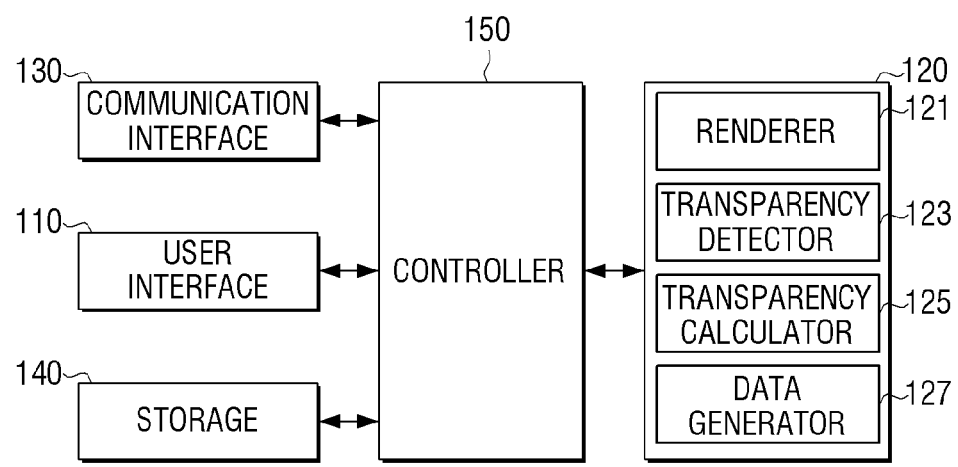
FIG. 3 is a detailed block diagram illustrating a print controlling apparatus according to an embodiment of the present general inventive concept.

FIG. 3 is a detailed block diagram illustrating the print controlling apparatus 100 of FIG. 1 or 2 according to an embodiment of the present general inventive concept.

Referring to FIG. 3, the print controlling apparatus 100 can include the user interface 110, the printing data generator 120, the communication interface 130, a storage 140, and a controller 150.

The printing controlling apparatus 100 may include a printer driver to control an operation of generating printing data and/or print option to be transmitted to an external image forming apparatus, and the printer driver is associated with the external image forming apparatus.

The user interface 110 and the communication interface 130 may have the same operations as described in FIG. 2, and thus, detail descriptions thereof will be omitted here.

The printing data generator 120 generates the printing data by parsing a rendering command for each object in the document. The printing data generator 120 detects whether the transparency is set in the corresponding document by parsing the rendering command of the objects. When the transparency is set in one object, the printing data generator 120 can generate the transparency image of the corresponding transparency region and generate the printing data by replacing the detected transparency region of the rendered image with the generated transparency image. The printing data generator 120 can include a renderer 121, a transparency detector 123, a transparency calculator 125, and a data generator 127.

The renderer 121 renders each object in the document according to the rendering command. In detail, the renderer 121 can receive object information (e.g., brush, text, image, stroke, line, ROP, and coordinates) from a Graphics Device Interface (GDI) of an Operating System (OS) of the print controlling apparatus 100, and can render the object according to the rendering command ROP of the received object information.

When one or more rendering commands of a preset combination are input for the same region, the transparency detector 123 detects an input region of the rendering commands of the preset combination as the transparency region. In detail, when an XOR rendering command, an AND rendering command, and an XOR rendering command are input in sequence for the same region, the transparency detector 123 can detect the corresponding region as the transparency region. Detailed operations of the transparency detector 123 will be explained by referring to FIGS. 7 and 8.

When the transparency region is detected, the transparency calculator 125 calculates the transparency of the detected transparency region. In detail, the transparency calculator 125 can calculate the transparency by calculating a ratio of a background value to a whole transparency pattern size. The operations of the transparency calculator 125 will be explained in more detail by referring to FIGS. 10 and 11.

The data generator 127 generates the transparency image by perform the alpha-blending process on the detected transparency region. In detail, the data generator 127 generates the transparency image by calculating one or more pixel values of the detected transparency region. That is, the data generator 127 can generates the transparency image by calculating the pixel value of each pixel region in the detected transparency region based on the pixel value of the background object in the transparency region, the pixel value of the overlaid object in the transparency region, and the calculated transparency.

The data generator 127 generates the printing data. In detail, when the transparency is not detected, the data generator 127 can generate the printing data based on the rendering image generated by the renderer 121. The printing data generated by the data generator 127 can be PDL data written in the PCL or the PS language.

When the transparency detector 123 detects the transparency, the data generator 127 can generate the printing data including the generated transparency image. In detail, the data generator 127 can replace the transparency region detected in the rendering image generated by the renderer 121 with the generated transparency image.

According to the embodiment, operations can be performed to detect the transparency and generate the transparency image after the document rendering. However, it is possible that the above-described operations can be conducted all together with respect to one rendering command in the implementation. In detail, when the rendering is carried out for one ROP command and the corresponding ROP command corresponds to the transparency, the transparency may be calculated for the corresponding ROP command, the alpha blending pixel value of the corresponding region may be calculated, and the calculated alpha blending pixel value may be recorded in an output buffer area corresponding to the ROP command. These operations will be explained in more detail by referring to FIG. 16.

According to the embodiment, the print controlling apparatus 100 can perform the rendering, the image forming apparatus 200 may carry out the rendering. Hence, when the print controlling apparatus 100 does not perform the rendering, the printing data generator 120 can generate the printing data merely by converting the object information received from the GDI to the language recognizable by the image forming apparatus 200. When the transparency region is detected, the printing data generator 120 can notify the image forming apparatus 200 of the transparency detection, transparency region position information, and the transparency (for example, a level of transparency, or % information) using a PJL command.

When the image forming apparatus 200 performs the rendering, the print controlling apparatus 100 can send a transparency pattern to the image forming apparatus 200. In detail, when the image forming apparatus 200 performs the rendering, the print controlling apparatus 100 may generate the printing data including the transparency pattern and send the generated printing data to the image forming apparatus 200. When the PJL command carries the transparency (the % information) to the image forming apparatus 200, the transparency pattern may not be provided to the image forming apparatus 200 in the implementation.

The storage 140 stores the document. Herein, the document is data written by various word processor application programs. The storage 140 stores the printing data. In detail, the storage 140 can temporarily store the printing data generated by the printing data generator 120. The storage 140 can include an output buffer. Herein, the output buffer stores the printing data rendered by the printing data generator 120 and can correspond to a size of a printing paper sheet according to the rendered printing data.

The storage 140 stores the transparency pattern. Herein, the transparency pattern is a pattern used to apply the transparency. The storage 140 can store a plurality of transparency patterns corresponding to a plurality of transparency levels, for example, the transparencies 1% through 99%. The storage 140 can be implemented using not only a storage medium in the print controlling apparatus 100 but also an external storage medium, a removable disk including a USB memory, and a web server over a network.

The storage 140 can store the transparency corresponding to the transparency pattern. In detail, the storage 140 may store the transparency corresponding to each transparency pattern in a lookup table. In this case, the transparency calculator 125 can obtain the transparency using a pre-stored lookup table, instead of the aforementioned calculation.

The controller 150 controls the components of the print controlling apparatus 100. In detail, when receiving the printing command through the user interface 110, the controller 150 can control the user interface 110 to display a user interface (UI) window to select the printing option for the corresponding document. The controller 150 controls the printing data generator 120 to detect whether the corresponding document includes the transparency. Upon detecting the transparency, the controller 150 can control the printing data generator 120 to generate the transparency image of an alpha blending type with respect to the transparency region and to generate the printing data including the generated transparency image.

The controller 150 can control the communication interface 130 to send the generated printing data to the image forming apparatus 200. The controller 150 may control the storage 140 to store the printing data generated by the printing data generator 120. In detail, as the user can repeatedly output the selected document, the generated printing data may be stored to the storage 140.

As such, the print controlling apparatus 100 can determine whether the selected document includes the transparency object by parsing the rendering command of the object. When the document includes the transparency object, the print controlling apparatus 100 can generate the transparency image by alpha-blending the corresponding object, to thus enhance the image quality of the transparency object.

Figure 4:
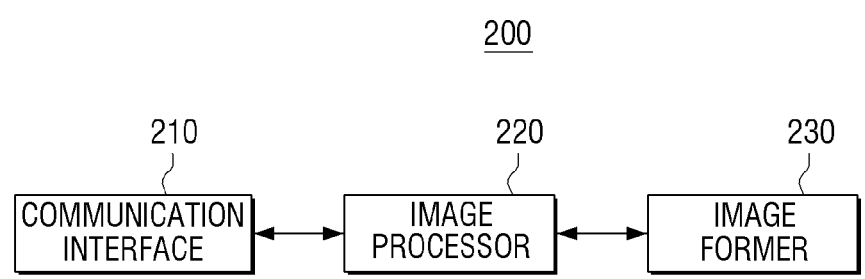
FIG. 4 is a block diagram illustrating an image forming apparatus according to an embodiment of the present general inventive concept.

FIG. 4 is a block diagram illustrating the image forming apparatus 200 of FIG. 1 according to an embodiment of the present general inventive concept.

Referring to FIG. 4, the image forming apparatus 200 includes a communication interface 210, an image processor 220, and an image former 230.

The communication interface 210 is connected with the print controlling apparatus 100 or a general print controlling apparatus, and receives the printing data and the printing option from the print controlling apparatus. In detail, the communication interface 210 can interconnect the image forming apparatus 200 and an external device, for example, a print controlling apparatus, and employ a parallel port, a USB port, or a wireless port to communicate with an external device.

In this embodiment, the printing data and the printing option are transmitted individually. When the printing data includes the printing option, only the printing data may be received. Herein, the received printing data may be or may not be rendered by the print controlling apparatus 100.

The image processor 220 may detect whether the received printing data is prepared according to an alpha-blending process as described above. When the image processor 220 determines that the received printing data has been prepared according to the alpha blending process by detecting the printing data including a generated transparency image, by detecting the existence of the transparency image, or by detecting whether the printing data is rendered, a predetermined control operation and a predetermined general printing operation may be performed by the image processor 220 and the image former 230, respectively, according to an embodiment of the present general inventive concept. When the image processor 220 determines that the received printing data has not been prepared according to the alpha-blending process by detecting the printing data including the generated transparency image, by detecting the existence of the transparency image, or by detecting whether the printing data is rendered, the image processor 220 may perform a control operation as follows.

The image processor 220 detects the transparency region of the set transparency from the overlaid objects, generates the transparency image by calculating the pixel value of the transparency region based on the pixel value of each object and the transparency, and generates the printing image including the transparency image. Structure and operations of the image processor 220 shall be explained by referring to FIG. 5.

The image former 230 prints a printing image. In detail, the image former 230 can print the printing image generated by the image processor 220 onto a printing paper. The image former 230 can be of a laser printing type or an inkjet type. The image former 230 can a print engine to perform color printing, or a print engine to perform only monochrome printing.

Although FIG. 4 illustrates the image forming apparatus 200, the image forming apparatus 200 may further include other components to perform its functions. The image forming apparatus 200 will be explained in more detail by referring to FIG. 5.

Figure 5:
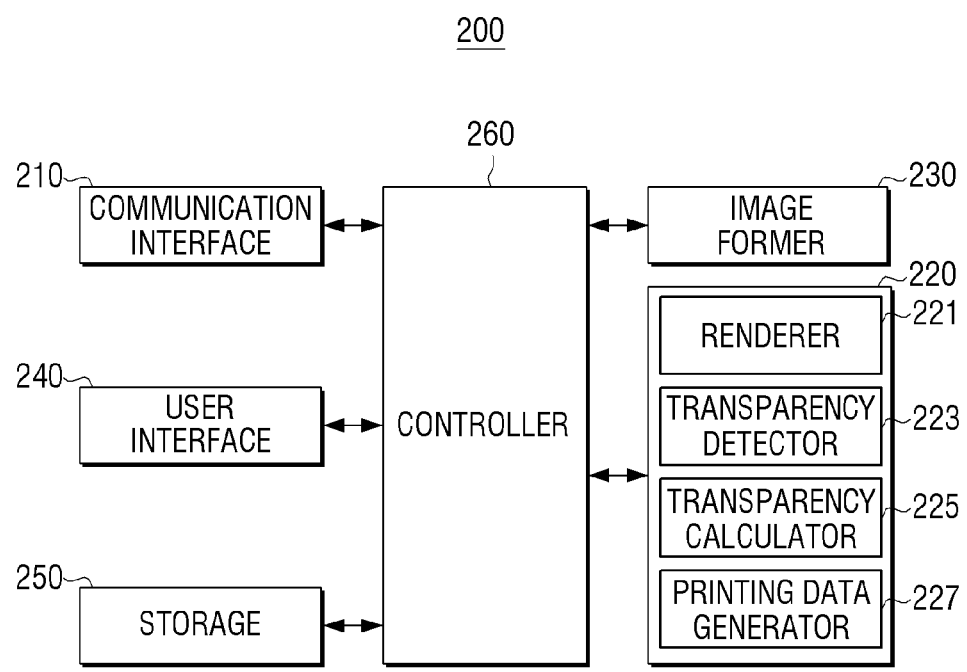
FIG. 5 is a detailed block diagram illustrating an image forming apparatus according to an embodiment of the present general inventive concept.

FIG. 5 is a detailed block diagram illustrating the image forming apparatus 200 of FIG. 1 or 4 according to an embodiment of the present general inventive concept.

Referring to FIG. 5, the image forming apparatus 200 includes the communication interface 210, the image processor 220, the image former 230, a user interface 240, a storage 250, and a controller 260.

The communication interface 210 and the image former 230 are the same as described in FIG. 4 and thus detail descriptions thereof be omitted here.

The image processor 220 generates the printing data by parsing the rendering command for the objects in the printing data. The image processor 220 can detect whether the transparency is set in the corresponding document by parsing the rendering command of the objects. When the transparency is set in one object, the image processor 220 can generate the transparency image of the corresponding transparency region and generate the printing data by replacing the detected transparency region of the rendered image with the generated transparency image. The image processor 220 can include a renderer 221, a transparency detector 223, a transparency calculator 225, and a printing image generator 227.

The renderer 221 renders each object in the printing data according to the rendering command. In detail, the renderer 221 can render the objects in the printing data using the object information (e.g., brush, text, image, stroke, line, ROP, and coordinates) of the printing data.

As stated above, the rendering can be carried out by the print controlling apparatus 100 of FIGS. 2 and 3. When the print controlling apparatus 100 performs the rendering, that is, when the printing data is the rendered data, the image forming apparatus 200 may not conduct the separate rendering.

When the rendering commands of the preset combination are input for the same region, the transparency detector 223 detects the input region of the rendering commands of the preset combination as the transparency region. In detail, when an exclusive OR (XOR) rendering command, an AND rendering command, and the XOR rendering command are input in sequence for the same region, the transparency detector 223 can detect the corresponding region as the transparency region. Detailed operations of the transparency detector 223 will be explained by referring to FIGS. 7 and 8.

Meanwhile, the transparency region may be detected by the print controlling apparatus 100. Accordingly, when the printing data including the transparency information is received, the transparency detector 223 can determine the presence or absence of the object including the transparency according to whether the received printing data includes the transparency information. In this case, the transparency detector 223 can detect the transparency region based on the transparency information of the printing data (or the PJL command).

When the transparency region is detected, the transparency calculator 225 calculates the transparency of the detected transparency region. In detail, the transparency calculator 225 can calculate the transparency by calculating a ratio of a background value to a whole transparency pattern size. The operations of the transparency calculator 225 will be explained in more detail by referring to FIGS. 10 and 11.

The transparency may be calculated by the print controlling apparatus 100. Accordingly, when the printing data (or the PJL command) including the transparency information is received, the transparency calculator 225 can obtain the transparency of the object of the applied transparency according to whether the received printing data includes the transparency information. Meanwhile, even when the transparency information is transmitted together with the transparency pattern, the transparency calculator 225 may calculate the transparency using the transmitted transparency pattern and utilize the calculated transparency.

The printing image generator 227 generates the transparency image by alpha-blending the detected transparency region. In detail, when the print controlling apparatus 100 does not alpha-blend the document of the transparency, the printing image generator 227 generates the transparency image by calculating the pixel value of the detected transparency region. That is, the printing image generator 227 can generate the transparency image by calculating the pixel value of each pixel region in the detected transparency region based on the pixel value of the background object in the transparency region, the pixel value of the overlaid object in the transparency region, and the calculated transparency.

The printing image generator 227 generates the printing image. In detail, when detecting no transparency in the received printing data, the printing image generator 227 can generate the printing image based on the image rendered by the renderer 221 or the rendered image in the received printing data (that is, when the print controlling apparatus 100 renders the data).

When the transparency is detected in the received printing data and the transparency image is generated, the printing image generator 227 can generate the printing image including the generated transparency image. In detail, the printing image generator 227 can generate the printing image by replacing the detected transparency region of the rendered image with the generated transparency image. While the transparency region of the rendered image is replaced by the transparency image after completing the document rendering, these operations can be performed during the rendering in the implementation. That is, as rendering each object, the transparency may be detected, the transparency image may be generated, and the pixel value of the corresponding region may be replaced by the alpha-blended value.

The printing image generator 227 can halftone the generated printing image. In detail, the printing image generator 227 can halftone the generated printing image using a halftoning screen pre-stored in the storage 250. It is possible that the halftoning pattern can be determined in accordance with the transparency pattern. It is also possible that the transparency image is generated by alpha-blending the transparency region without using the transparency pattern in the embodiment of the present general inventive concept. Thus, the halftoning pattern can be determined regardless of the transparency pattern. That is, the printing image generator 227 can halftone the printing image using an optimal halftoning pattern corresponding to the printing option of the printing data.

While the printing image generator 227 halftones the printing image, the image former 230 may perform the halftoning in the implementation. Herein, the halftoning is a process of converting a multi-level image to a binary-level image.

The user interface 240 includes a plurality of function keys to allow the user to set or select various functions supported by the image forming apparatus 200, and displays information provided from the image forming apparatus 200. The user interface 240 may be implemented using an input/output device such as touch screen or panel, and using a device combining a mouse and a monitor.

The user interface 240 can receive the selection of the transparency enhance option. In detail, the user interface 240 can display a user interface window to set the option, and select the transparency enhance option through the displayed user interface window. When the user selects the transparency enhance option, the transparency region can be detected and a preset algorithm (alpha blending image generation) can be applied.

The storage 250 stores the printing data. In detail, the storage 250 stores the printing data received through the communication interface 210. The storage 250 can store the printing data (i.e., the printing image) rendered by the image processor 220. The storage 250 can store the printing data halftoned by the image processor 220.

The storage 250 can store various halftoning screens. The storage 250 can store halftoning screen information corresponding to the printing option in a lookup table. In detail, with every halftoning screen applicable, the lookup table of the halftoning screen patterns corresponding to the printing options can be generated according to a design or user preference such that degrade of the image quality can be prevented, by performing a task of every printing option applicable, and the lookup table can be stored in the storage 250. Hence, the image processor 220 can select the halftoning screen corresponding to the printing option applied to the current printing data using the pre-stored lookup table, and halftone the printing data using the selected halftoning screen. The lookup table can be generated by a manufacturer and stored to the storage 250 before the release, and can be updated through firmware update. It is possible that the plurality of the halftoning screens is used here. It is also possible that the image forming apparatus 200 may use a single halftoning screen in the implementation.

The storage 250 stores the transparency pattern. Herein, the transparency pattern is usable to apply the transparency, and the storage 250 can store the plurality of the transparency patterns corresponding to transparency levels, for example, the transparencies 1% through 99%.

The storage 250 can store the transparency corresponding to the transparency pattern. In detail, the storage 250 may store the transparencies corresponding to the transparency patterns in a lookup table. When the lookup table is stored, the transparency calculator 225 can obtain the transparency using the pre-stored lookup table, instead of the aforementioned calculation.

The controller 260 can control the components of the image forming apparatus 200. In detail, the controller 260 determines whether the printing data received through the communication interface 210 is the rendered data. When the printing data is the rendered data, the controller 260 determines whether the printing data includes the transparency information. When determining the transparency information, the controller 260 can control the image processor 220 to generate the alpha-blended image according to the transparency information.

When the received printing data is not the rendered data, the controller 260 can control the image processor 220 to render the received printing data and to detect whether the rendered printing data has the transparency. When detecting the transparency, the controller 260 can control the image processor 220 and the image former 230 to print the data according to a preset image quality enhancement algorithm.

As such, the image forming apparatus 200 detects whether the received printing data has the transparency, and generates and prints the transparency image by alpha-blending the object of the transparency when the transparency is detected. Thus, the image quality of the output image can be improved.

Figure 6A:
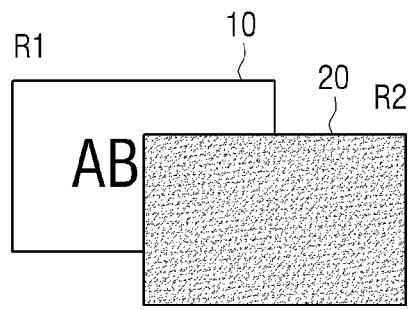
FIGS. 6A and 6B are diagrams illustrating a document written by a user.
Figure 6B:
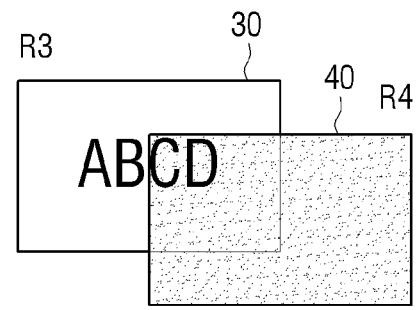

FIGS. 6A and 6B are diagrams illustrating a document prepared or written by a user. Specifically, FIG. 6A illustrates a document without the transparency or with an opaque object, and FIG. 6B illustrates a document with the transparency or translucency.

Referring to FIG. 6A, the user first draws (creates, inputs, or generates) a quadrangular object R1 10 and creates (creates, inputs, or generates) a quadrangular object R2 20 such that the object R2 20 is disposed (or superimposed) on the object R1.

Referring to FIG. 6B, the user first draws (creates, inputs, or generates) a quadrangular object R3 30 and then draws (creates, inputs, or generates) a quadrangular object R4 40 such that the object 40 is disposed over the object R3 with the transparency or translucency. The rendering command for the two objects R3 and R4 is illustrated in FIG. 7 or FIG. 8.

FIGS. 7 and 8 are diagrams illustrating the rendering command to generate the document of FIG. 6B.

Referring to FIGS. 3, 5, 6B and 7, the renderer 121 and 221 can record the quadrangle brushed with a blue color according to a first rendering command Brush XOR ROP in the output buffer. Next, according to a second rendering command Pattern Bush AND ROP, the renderer 121 and 221 can record the transparency region showing both an object pre-rendered by a pattern brush and the overlaid object R4 in the output buffer. Next, the renderer 121 and 221 changes to the XOR brush according to a third rendering command Brush XOR ROP.

Referring to FIGS. 3, 5, 6B, and 8, the renderer 121 and 221 can record the quadrangular image brushed with a blue color according to a first rendering command Bitmap XOR ROP in the output buffer. Next, according to a second rendering command Bitmap 1 bit pattern AND ROP, the renderer 121 and 221 can record the transparency region showing both the object pre-rendered by the pattern brush and the overlaid object R4 in the output buffer. Next, the renderer 121 and 221 changes to the XOR brush according to a third rendering command Bitmap XOR ROP.

As such, the transparency is realized using the combination of the ROP, rather than a simple command.

When the XOR rendering command, the AND rendering command, and the XOR rendering command are sequentially applied to one region, the transparency is applied to the corresponding region.

Hence, when the XOR rendering command, the AND rendering command, and the XOR rendering command are sequentially input to the same region, the transparency detector 123 and 223 can detect the corresponding region as the transparency region.

Figure 9:
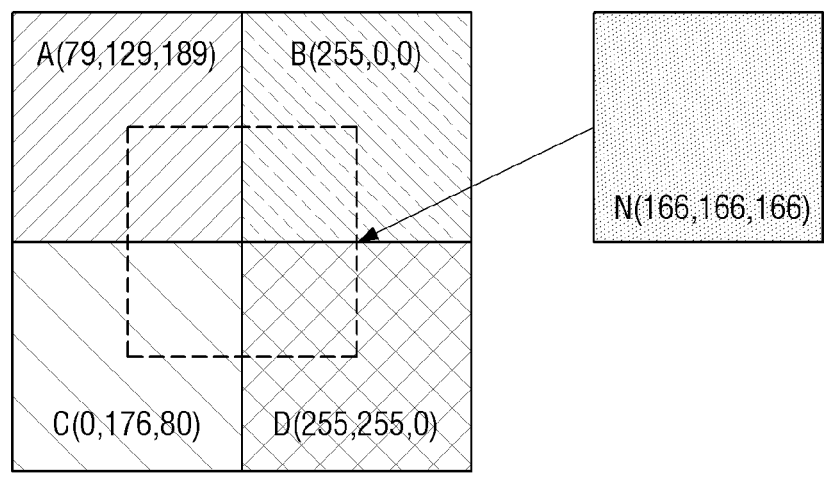
FIG. 9 is a diagram illustrating an object from a word processor.

FIG. 9 is a diagram illustrating an object generated from a processor. The processor may be a word processor.

Referring to FIG. 9, when digital data is sent to a printer, an application programming interface (API) to process the alpha blending may not be defined. Particularly, since the PCL and PS printing languages are most widely used to not define the alpha blending command, most of applications make the data look overlapped using the pattern, which is referred to as Pattern ROP. In this case, a plurality of objects is transmitted to the printer driver or the image forming apparatus. Herein, an object on a left side of FIG. 9 is referred to as a background object and has four regions with color component values A through D, for example, and an object on a right side of FIG. 9 is referred to as an overlaid object and has at least one region with at least one color component value N, for example.

Meanwhile, when the commands of FIGS. 7 and 8 are defined between the background object and the overlaid object, the overlaid object has the transparency.

When the two objects have a transparency relation therebetween, the rendering image may be generated using a transparency pattern of FIG. 11. However, the method using the transparency pattern selectively displays the pixel value of the background object according to a transparency pattern value or displays the pixel value of the overlaid object. Thus, an output result or a printed image may be produced and output to be seen as uncomfortable image to user eyes because of interference with a halftoning pattern.

Hence, the present general inventive concept calculates a transparency rate using a transparency pattern, and generates a transparency image by alpha-blending a background object and an overlaid object on a transparency region.

A method of calculating the transparency is explained hereinafter by referring to FIGS. 10 and 11.

FIG. 10 is a diagram illustrating a method of calculating a transparency using a transparency pattern according to an embodiment of the present general inventive concept, and FIG. 11 is a diagram illustrating a transparency pattern from a processor, for example, a word processor, according to an embodiment of the present general inventive concept.

Referring to FIG. 10, the transparency can be obtained by calculating a ratio of a background value to an entire transparency pattern size. For example, using the transparency pattern of FIG. 11, the number of elements applying the background color A is 153, A width of the pattern B is 16, and a length of the pattern C is 16, and a weight is determined according to a device, as illustrated in FIG. 10. As a result, the transparency can be 59.77 according to a formula of $(A/(B*C))*100*D$.

The weight given to the image forming apparatus can be applied to the calculated transparency. Herein, the weight can be set by an experiment on the image forming apparatus by a manufacturer or a user control value. Accordingly, the manufacturer or the user can regulate the transparency level by adjusting the weight. For example, a weight greater than 1 can be used to increase the transparency, and a weight smaller than 1 can be used to decrease the transparency. At this time, the transparency finally applied cannot exceed 0~100%.

When the transparency is calculated, the pixel value of each pixel in the transparency region can be calculated using the calculated transparency and the following equation.

$$Result.Red=Object.Red*(1-Alpha)+Backgruound.Red*Aplpha$$

$$Result.Green=Object.Green*(1-Alpha)+Backgruound.Green*Aplpha$$

$$Result.Blue=Object.Blue*(1-Alpha)+Backgruound.Blue*Aplpha \quad [\text{Equation 1}]$$

Object.Red, Object.Green, and Object.Blue are RGB values in a particular pixel of the overlaid object, Backgruound.Red, Backgruound.Green, and Backgruound.Blue are RGB values in a particular pixel of the background object overlapping with the particular pixel of the overlaid object, Result.Red, Result.Green, and Result.Blue are RGB values of the alpha-blending result, and Aplpha is the calculated transparency.

Figure 12:
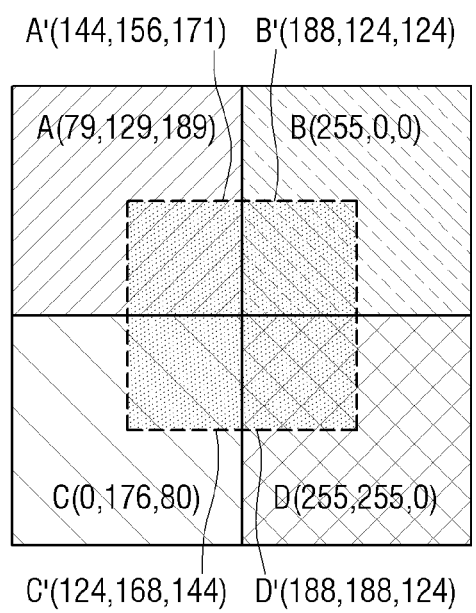
FIG. 12 is a diagram illustrating a rendering image generated according to an embodiment of the present general inventive concept.

Now, the alpha-blending process of an actual object is described by referring to FIG. 12.

Referring to FIG. 12, four regions of the background object have RGB values of A(79, 129, 189), B(255, 0, 0), C(0, 176, 80), and D(255, 255, 0). The overlaid object has the RGB values of N(166, 166, and 166).

When the calculated transparency is 25%, the alpha blending of a region with a color component value, for example, an RBB value, A' can be calculated as below.

$$A'(R)=166*(1-0.25)+79*0.25=144$$

$$A'(G)=166*(1-0.25)+129*0.25=156$$

$$A'(B)=166*(1-0.25)+189*0.25=171 \quad [\text{Equation 2}]$$

When the alpha blending is applied to the regions B', C', and D' in the same manner, the alpha blending image of the transparency region has the following RGB value as illustrated in FIG. 12.

$$A'=RGB(144,157,172)$$

$$B'=RGB(188,125,125)$$

$$C'=RGB(125,169,145)$$

$$D'=RGB(188,188,125)$$

As the transparency region is alpha-blended, the printing output result can be improved. In particular, when the output size is reduced using an N-up option, two objects are combined based on the transparency rate per pixel, rather than reducing a space of the pattern. Thus, even when the original document is reduced or enlarged for the printing, the distortion of the transparency pattern can be avoided.

So far, while the transparency is obtained using the calculation, the transparency may be obtained using the lookup table of the transparency corresponding to the transparency pattern in the implementation.

While the RGB value is alpha-blended, a CMYK value can be alpha-blended in the implementation. In detail, the image forming apparatus prints data using the CMYK and converts the received RGB value to the CMYK value. Hence, in a system which immediately converts the RGB value to the CMYK value during the rendering, the image forming apparatus 200 may perform the blending by modifying and applying Equation 1 to the CMYK value.

Figure 13:
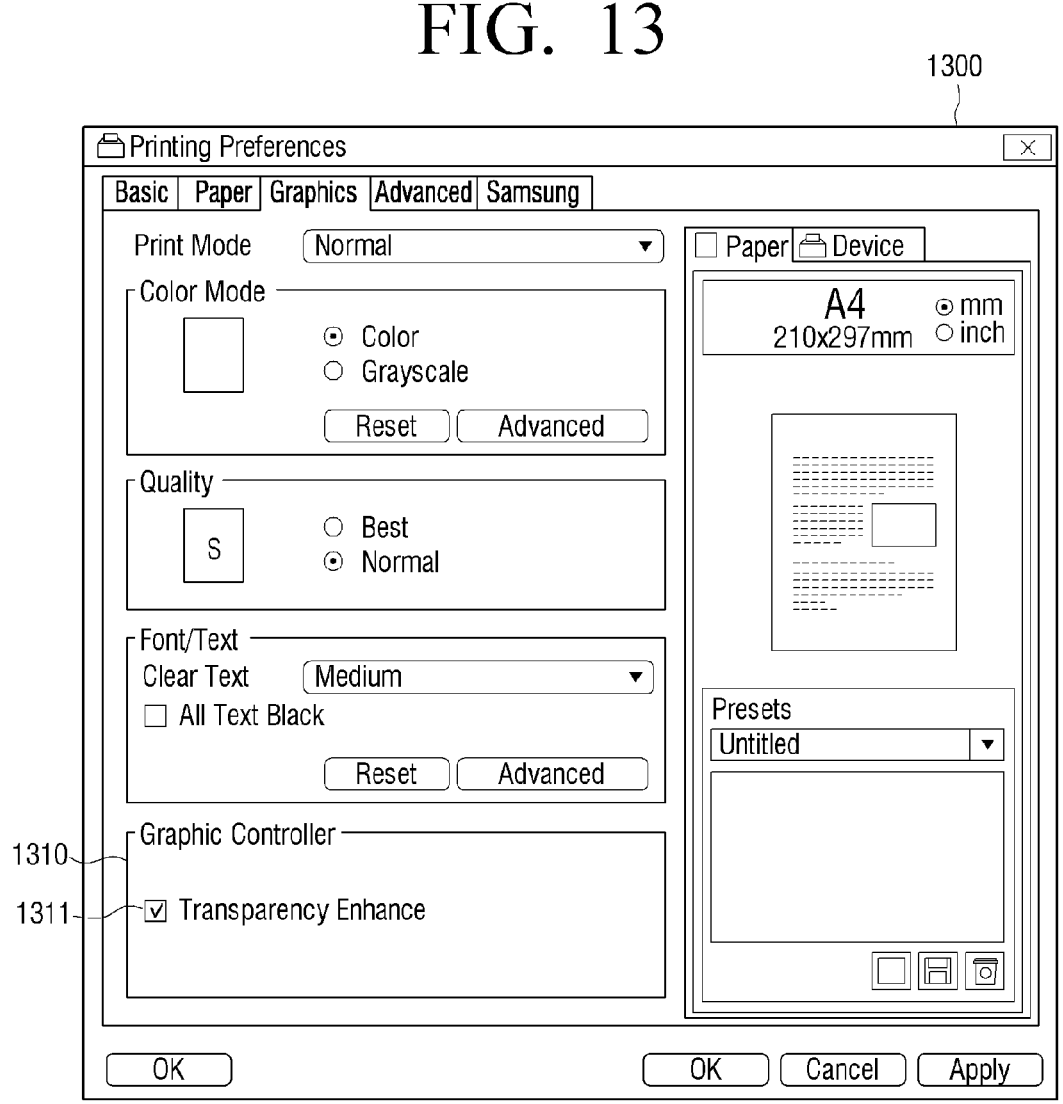
FIG. 13 is a diagram illustrating a user interface window displayable by a user interface of FIG. 2.

FIG. 13 is a diagram illustrating a user interface window 1300 displayable by the user interface 110 of FIG. 2.

Referring to FIG. 13, the user interface window 1300 includes various regions to set one or more printing options to be applied to the document, and includes a region 1310 to set a transparency enhance option 1311. When a user sets the transparency enhance option 1311 and the rendering has not been performed in a print controlling apparatus, the PJL command including the transparency information can be sent to the image forming apparatus 200. That is, when the transparency enhance option is set, the PJL command instructing the image forming apparatus 200 to detect the transparency region can be sent to the image forming apparatus 200.

While a preview image is not illustrated in FIG. 13, the user interface window 1300 can display the preview image in the implementation. Specifically, the user interface window 1300 may display the preview image of the output result when the transparency image is generated and output using the alpha blending.

Figure 14:
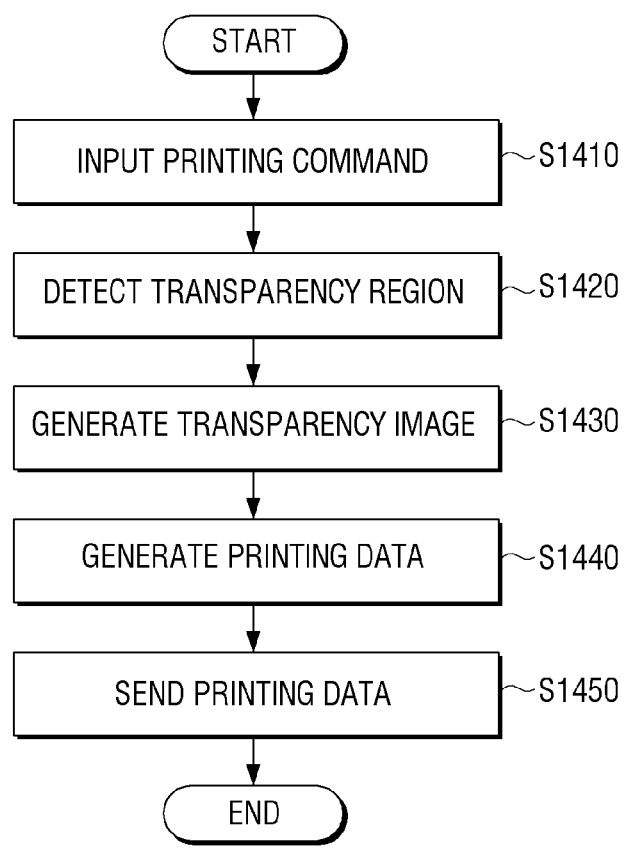
FIG. 14 is a flowchart illustrating a print controlling method according to an embodiment of the present general inventive concept.

FIG. 14 is a flowchart illustrating a print controlling method according to an embodiment of the present general inventive concept.

When the printing command is input at operation S1410, the region of the applied transparency can be detected by parsing the rendering command for each of the objects in the document at operation S1420. In detail, the method includes receiving the object information (e.g., brush, text, image, stroke, line, ROP, and coordinates) from the GDI of the OS of the print controlling apparatus, and rendering the object according to the rendering command ROP of the received object information. When the XOR rendering command, the AND rendering command, and the XOR rendering command are input in sequence for the same region, the method can detect the corresponding region as the transparency region.

The transparency image of the detected transparency region is generated at operation S1430. In detail, the method includes generating the transparency image by calculating the pixel value of each pixel region in the detected transparency region based on the pixel value of the background object in the transparency region, the pixel value of the overlaid object in the transparency region, and the calculated transparency.

The printing data including the generated transparency image is generated at operation S1440. In detail, the method includes generating the transparency image by calculating the pixel value of each pixel region in the detected transparency region based on the pixel value of the background object in the transparency region, the pixel value of the overlaid object in the transparency region, and the calculated transparency.

The generated printing data is sent to the image forming apparatus at operation S1450. In so doing, the generated printing data can be stored. In detail, the printing data can be generated by replacing the transparency region detected in the generated rendered image, with the generated transparency image. As the user can repeatedly output the selected document, the generated printing data may be stored.

As such, the print controlling method can determine whether the selected document includes the transparency object by parsing the rendering command for the object, and generate the transparency image by alpha-blending the corresponding object when the document includes the transparency object, thus improving the image quality of the transparency object. The print controlling method of FIG. 14 can be fulfilled in the print controlling apparatus 100 of FIG. 2 or FIG. 3, or other print controlling apparatuses.

As described above, the transparency is detected and the transparency image is generated after rendering the printing data. However, it is possible that these operations can be conducted immediately upon the object rendering. That is, in a process of the object rendering, the transparency can be detected, the transparency image can be generated, and the pixel value of the corresponding region can be replaced by the alpha-blending value, which will be explained by referring to FIG. 16.

Figure 15:
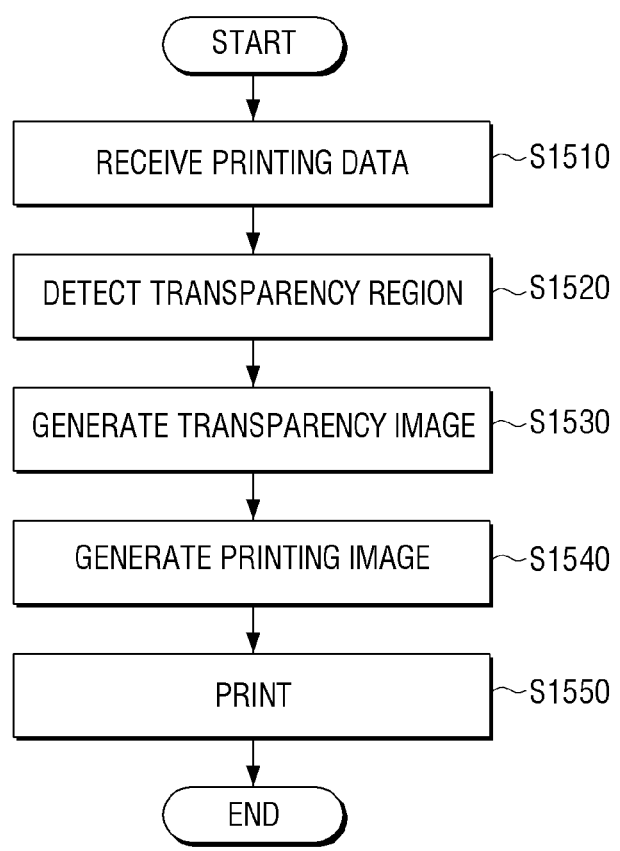
FIG. 15 is a flowchart illustrating an image forming method according to an embodiment of the present general inventive concept.

FIG. 15 is a flowchart illustrating an image forming method according to an embodiment of the present general inventive concept.

The method includes receiving the printing data at operation S1510.

The method includes rendering the objects in the received printing data according to the respective rendering commands. When the rendering commands of the present combination are input for the same region, the method detects the input region of the rendering commands of the preset combination as the transparency region at operation S1520. In detail, the method can render each object in the received printing data according to the rendering command ROP. When the XOR rendering command, the AND rendering command, and the XOR rendering command are input in sequence for the same region, the method can detect the corresponding region as the transparency region.

The method includes generating the transparency image of the detected transparency region at operation S1530. In detail, the method can generate the transparency image by calculating the pixel value of each pixel region in the detected transparency region based on the pixel value of the background object in the transparency region, the pixel value of the overlaid object in the transparency region, and the calculated transparency.

The method includes generating the printing image including the generated transparency image at operation S1540. In detail, the method can generate the printing image by replacing the transparency region detected in the rendered image with the generated transparency image.

The method may include printing the generated printing image at operation S1550.

As such, the image forming method determines whether the received printing data includes the transparency, and generates and outputs the printing image by alpha-blending the detected transparency region when the transparency is detected, thus enhancing the image quality of the output image. The image forming method of FIG. 15 can be fulfilled in the image forming apparatus 200 of FIG. 4 and/or FIG. 5, or other image forming apparatuses.

As described above, the transparency is detected and the transparency image is generated after rendering the printing data. However, it is possible that these operations can be conducted immediately upon the object rendering. That is, in the process of the object rendering, the transparency can be detected, the transparency image can be generated, and the pixel value of the corresponding region can be replaced by the alpha-blending value, which will be explained by referring to FIG. 16.

The image forming method can be realized by a program including an algorithm executable in a computer, and the program can be stored to a non-transitory computer readable medium.

Figure 16:
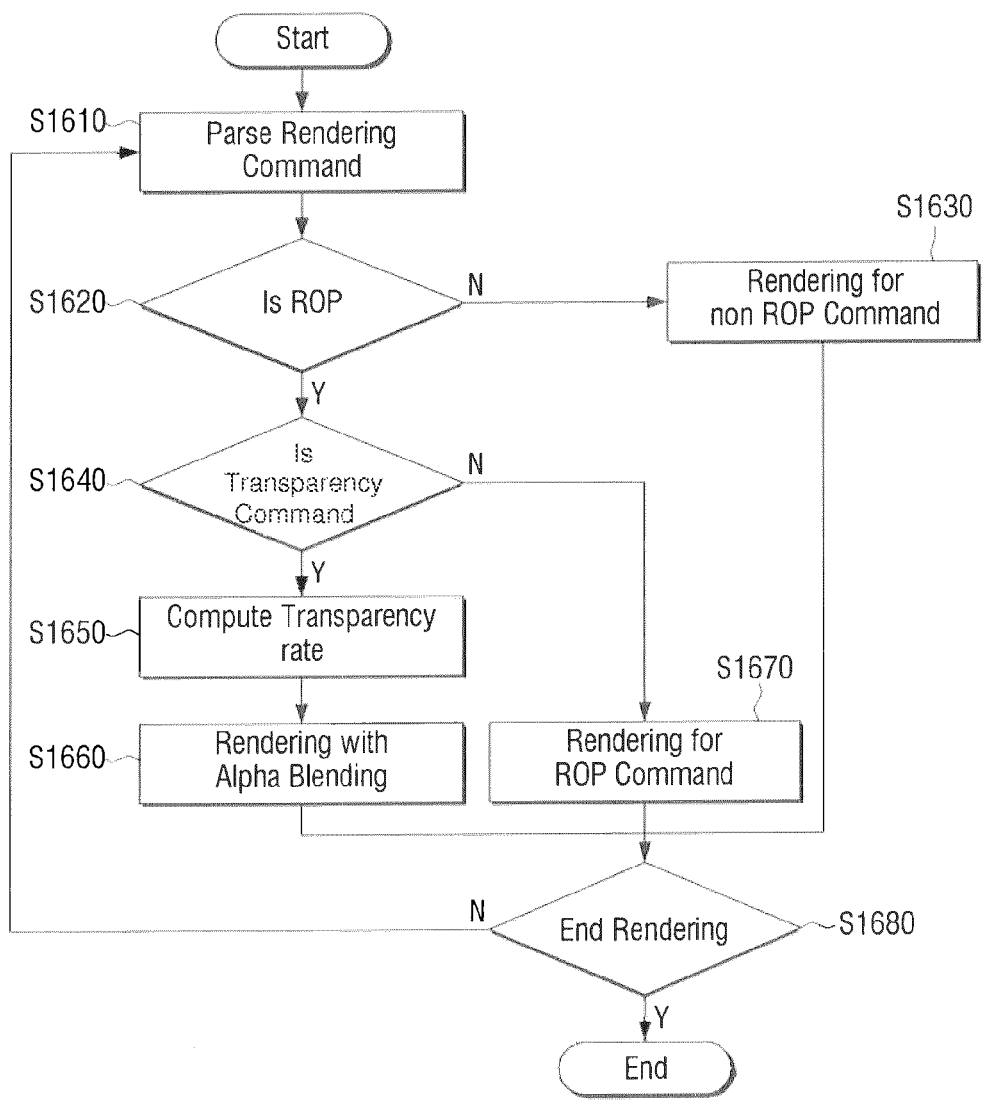
FIG. 16 is a detailed flowchart illustrating a method of detecting a transparency region and generating a transparency image of FIGS. 14 and 15.

FIG. 16 is a detailed flowchart illustrating a method of detecting a transparency region and generating a transparency image of the method of FIGS. 14 and 15.

Referring to FIG. 16, the method includes parsing the transmitted command at operation S1610. When the print controlling apparatus detects the transparency, the command is sent from the GDI. When the image forming apparatus detects the transparency, the command is converted to the language recognizable by the image forming apparatus.

The method includes determining whether the parsed rendering command is the ROP command at operation S1620. Herein, the rendering command instructs the actual pixel writing such as draw rectangle, draw font, draw image, and draw line.

When the rendering command is not the ROP command (S1620-N), for example, when the rendering command is a coordinate command, a brush command, or a clip region command for rendering the object, the method can process the corresponding command (S1630).

When the parsed rendering command is the ROP command at operation S1620-Y, the method determines whether the corresponding ROP command is the transparency command at operation S1640. In detail, when the XOR rendering command, the AND rendering command, and the XOR rendering command are input in sequence for the same region, the method can determine that the transparency command is input.

When the corresponding ROP command is not the transparency command at operation S1640-N, the method may include processing the corresponding ROP command at operation S1670.

When the corresponding ROP command is the transparency command at operation S1640-Y, the method calculates the transparency using the transparency pattern applied to the corresponding region at operation S1650 and alpha-blends the corresponding region based on the calculated transparency at operation S1660.

The method may include determining whether all of the commands are processed at operation S1680. When all of the commands are not processed, the method can repeat those operations.

So far, when the XOR rendering command, the AND rendering command, and the XOR rendering command are sequentially input for the same region, the corresponding region is detected as the transparency region. Since the XOR rendering command can be replaced by the combination of AND, OR, and NOT, the transparency region may be detected using other rendering command combination.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A print controlling apparatus connected to an image forming apparatus, comprising:
   a user interface to input a printing command of a document displaying a plurality of overlaid objects;
   an image processor to detect a transparency region where a transparency is set, in the overlaid objects, to generate a transparency image by calculating a pixel value of the transparency region, based on a pixel value of each object and the transparency, and to generate printing data including the transparency image; and
   a communication interface to send the printing data to the image forming apparatus, the image forming apparatus being configured to print the printing data, wherein
   when an XOR rendering command, an AND rendering command, and an XOR rendering command are sequentially input for the same region, the image processor detects the region as the transparency region,
   the image processor calculates the transparency of the detected transparency region by calculating a ratio of a background value to a whole size of a transparency pattern, and
   the image processor renders each object in the document according to a rendering command, detects an input region of the rendering commands of the preset combination, as the transparency region when rendering commands of a preset combination are input for the same region, and generates the transparency image by calculating a pixel value of the detected transparency region, and generates the printing data comprising the generated transparency image.

2. The print controlling apparatus of claim 1, wherein the image processor calculates the transparency by considering a weight preset for the image forming apparatus.

3. The print controlling apparatus of claim 1, wherein the image processor generates the transparency image by calculating a pixel value based on a pixel value of a background object in the transparency region, a pixel value of an overlaid object in the transparency region, and the calculated transparency with respect to pixel regions in the detected pixel region.

4. The print controlling apparatus of claim 1, wherein the image processor generates the transparency image by alpha-blending the detected transparency region.

5. The print controlling apparatus of claim 1, wherein the image processor generates the printing data by replacing the detected transparency region with the generated transparency image in an image rendered by the renderer.

6. The print controlling apparatus of claim 1, wherein the image processor generates the printing data in a PCL or PS printer language.

7. An image forming apparatus comprising:
   a communication interface to receive printing data;
   an image processor to detect a transparency region where a transparency is set, from a plurality of overlaid objects in the received printing data, to generate a transparency image by calculating a pixel value of the transparency region, based on pixel values of the objects and the transparency, and to generate second printing data including the transparency image; and
   an image former to print the generated second printing data, wherein
   when an XOR rendering command, an AND rendering command, and an XOR rendering command are sequentially input for the same region, the image processor detects the region as the transparency region,
   the image processor calculates the transparency of the detected transparency region by calculating a ratio of a background value to a whole size of a transparency pattern, and
   the image processor renders each object in the printing data according to a rendering command, detects an input region of the rendering commands of the preset combination, as the transparency region when rendering commands of a preset combination are input for the same region, generates the transparency image by calculating a pixel value of the detected transparency region, and generates the second printing data including the generated transparency image.

8. The image forming apparatus of claim 7, wherein the image processor generates the transparency image by alpha-blending the detected transparency region.

9. A print controlling method of a print controlling apparatus connected to an image forming apparatus, the method comprising:
   inputting a printing command of a document displaying a plurality of overlaid objects;
   detecting a transparency region where a transparency is set, in the overlaid objects;
   calculating the transparency of the detected transparency region by calculating a ratio of a background value to a whole size of a transparency pattern;
   generating a transparency image by calculating a pixel value of the transparency region, based on the pixel value of each object and the transparency;
   generating printing data comprising the generated transparency image; and
   sending the printing data to the image forming apparatus, the image forming apparatus being configured to print the printing data, wherein
   the detecting comprises detecting the region as the transparency region when an XOR rendering command, an AND rendering command, and an XOR rendering command are sequentially input for the same region, and
   the generating the transparency image comprises rendering each object in the document according to a rendering command, detecting an input region of the rendering commands of the preset combination, as the transparency region when rendering commands of a preset combination are input for the same region, and generating the transparency image by calculating a pixel value of the detected transparency region.

10. The print controlling method of claim 9, wherein the generating of the transparency image comprises generating the transparency image by calculating a pixel value based on a pixel value of a background object in the transparency region, a pixel value of an overlaid object in the transparency region, and the calculated transparency with respect to pixel regions in the detected pixel region.

11. An image forming method of an image forming apparatus, comprising:
    receiving printing data;
    detecting a transparency region where a transparency is set, from a plurality of overlaid objects in the received printing data;

calculating the transparency of the detected transparency region by calculating a ratio of a background value to a whole size of a transparency pattern;

generating a transparency image by calculating a pixel value of the transparency region, based on pixel values of the objects and the transparency;

generating a printing image comprising the transparency image; and printing the generated printing image, wherein the detecting comprises detecting the region as the transparency region when an XOR rendering command, an AND rendering command, and an XOR rendering command are sequentially input for the same region, and the generating the transparency image comprises rendering each object in the printing data according to a rendering command, detecting an input region of the rendering commands of the preset combination, as the transparency region when rendering commands of a preset combination are input for the same region, and generating the transparency image by calculating a pixel value of the detected transparency region.

12. The image forming method of claim 11, wherein the generating of the transparency image generates the transparency image by calculating a pixel value based on a pixel value of a background object in the transparency region, a pixel value of an overlaid object in the transparency region, and the calculated transparency with respect to pixel regions in the detected pixel region.

13. A non-transitory computer-readable recording medium containing computer-readable codes as a program to execute the print controlling method of claim 9.

14. An apparatus usable in an image forming system to print an image on a print medium, comprising:

an image processor configured to detect a transparency region according to a transparency from an image having one or more overlaid objects, to calculate the transparency of the detected transparency region by calculating a ratio of a background value to a whole size of a transparency pattern, to generate a transparency image by calculating a pixel value of the transparency region, based on a pixel value of each object and the transparency, and to generate printing data including the transparency image such that the generated printing data can be printed on the printing medium, wherein when an XOR rendering command, an AND rendering command, and an XOR rendering command are sequentially input for the same region, the image processor detects the region as the transparency region, and the image processor renders each object in the document according to a rendering command, detects an input region of the rendering commands of the preset combination, as the transparency region when rendering commands of a preset combination are input for the same region, generates the transparency image by calculating a pixel value of the detected transparency region, and generates the printing data comprising the generated transparency image.

15. The apparatus of claim 14, further comprising:

a user interface to input a printing command of the image having the overlaid objects; and a communication interface to send the printing data to an image forming apparatus of the image forming system such that the apparatus prints the printing data on the printing medium.

16. The apparatus of claim 14, further comprising:

a communication interface to receive original printing data including the image with the overlaid objects; and an image former to print the generated printing data on the printing medium.

17. The apparatus of claim 14, wherein the image processor generates the transparency image according to a halftoning level and a color component value of a corresponding pixel of the transparency region.

18. The apparatus of claim 14, wherein the image processor generates the transparency image according to values of a halftoning and a color component of the objects in the transparency region and a weight corresponding to the image forming system.

* * * * *